United States Patent [19]

Niwa et al.

[11] Patent Number: 5,094,918

[45] Date of Patent: Mar. 10, 1992

[54] SANDWICH GLASS

[75] Inventors: Hideyuki Niwa, Sayama; Masashi Segawa, Kodaira; Itsuo Tanuma, Sayama; Kazuo Naito, Kawasaki, all of Japan

[73] Assignee: Bridgestone Corporation, Tokyo, Japan

[21] Appl. No.: 624,870

[22] Filed: Dec. 10, 1990

[30] Foreign Application Priority Data

Dec. 11, 1989 [JP] Japan .................... 1-318921

[51] Int. Cl.⁵ .................. B32B 17/10; B32B 11/04
[52] U.S. Cl. ........................ 428/440; 428/429; 428/441; 428/442; 428/911
[58] Field of Search ............ 428/429, 440, 441, 442, 428/911

[56] References Cited

U.S. PATENT DOCUMENTS

| 3,622,440 | 11/1971 | Snedeker et al. | 428/429 |
| 3,666,614 | 5/1972 | Snedeker et al. | 428/412 |
| 4,065,589 | 12/1977 | Lenard et al. | 428/35 |
| 4,303,739 | 12/1981 | Beckmann et al. | 428/429 |

FOREIGN PATENT DOCUMENTS 57-196747  6/1982  Japan .
58-079850  5/1983  Japan .

Primary Examiner—Merrell C. Cashion, Jr.
Assistant Examiner—D. S. Nakarani
Attorney, Agent, or Firm—Sughrue, Mion, Zinn, Macpeak & Seas

[57] ABSTRACT

A sandwich glass comprises two glass plate and a resin layer interposed therebetween. In this case, the resin layer is produced by adding a hydrocarbon resin and an organic peroxide to ethylene-vinyl acetate copolymer and thermosetting them.

15 Claims, No Drawings

SANDWICH GLASS

BACKGROUND OF THE INVENTION

1. Field of the Invention

This invention relates to a sandwich glass usable for use in a front glass and a side glass of an automobile, a window glass of a building and the like.

2. Related Art Statement

In general, polyvinylbutyral resins have hitherto been mainly used as an intermediate layer for the sandwich glass. However, such a polyvinylbutyral resin is thermoplatic, so that it has the following drawbacks:

(1) Since the polyvinylbutyral resin has a relatively low softening point, the sliding of glass plates or formation of bubbles in the sandwich glass occur due to heat after the glass plates are stuck to the resin;

(2) Since the polyvinylbutyral resin is apt to be influenced by moisture, when the sandwich glass is left to stand under a high humidity atmosphere over a long period of time, the resin gradually whitens from the peripheral portion of the sandwich glass and also the adhesion force to the glass plate is reduced; and (3) The impact fracture resistance of the sandwich glass is dependant upon temperature, and particularly the penetration resistance rapidly decreases at a temperature region exceeding room temperature, that is, at a temperature not lower than about 30° C.

In order to solve the above drawbacks of the polyvinylbutyral resin, the inventors have previously proposed a sandwich glass obtained by interposing a thermosetting resin comprised of ethylene-vinyl acetate copolymer and an organic peroxide between glass plates and then conducting the thermosetting of the resin (Japanese Patent laid open No. 57-196747).

Considering a safeness as a great requirement of the sandwich glass, the impact resistance and the penetration resistance could not be said to be sufficient under wide conditions even in the inventors's previous inventions.

SUMMARY OF THE INVENTION

It is, therefore, an object of the invention to provide novel sandwich glasses which improve the impact resistance and penetration resistance as compared with the conventional sandwich glass and are safe even when the breakage is caused through external force.

In order to achieve the above object of the invention, the inventors have made various studies and found that the impact resistance and penetration resistance of the sandwich glass can be improved by adding 1-100 parts by weight of a hydrocarbon resin and 0.1-5 parts by weight of an organic peroxide to ethylene-vinyl acetate copolymer and then thermosetting them, and as a result the invention has been accomplished.

DESCRIPTION OF THE PREFERRED EMBODIMENTS

The hydrocarbon resin used in the invention includes anyone of natural resins and synthetic resins. As the natural resin, rosin, rosin derivatives and terpene resin are favorably used. As the rosin, use may be made f gum resin, tall oil resin, wood resin and the like. As the rosin derivative, use may be made of hydrogenated rosin, disproportionated rosin, rosin polymer, rosin ester and metal salt of rosin. As the terpene resin, use may be made of terpene resins such as α-pinene, β-pinene and the like as well as terpene phenol resin. Furthermore, dammar, copal and shellac may be used as the natural resin.

On the other hand, petroleum resins, phenolic resins and xylene resins are favorably used as the synthetic resin. As the petroleum resin, use may be made of aliphatic petroleum resin, aromatic petroleum resin, alicyclic petroleum resin, copolymeric petroleum resin, hydrogenated petroleum resin, pure monomeric petroleum resin and cumarone indene resin. As the phenolic resin, use may be made of alkyl phenol resins, modified phenolic resins and the like. As the xylene resin, use may be made of xylene resin and modified xylene resins.

According to the invention, the amount of the hydrocarbon resin added to ethylene-vinyl acetate copolymer is 1-100 parts by weight, preferably 2-80 parts by weight.

The hydrocarbon resin used in the invention has a weight average molecular weight of 200-50000, preferably 200-10000.

In the ethylene-vinyl acetate copolymer used in the invention, the content of vinyl acetate is 10-50% by weight, preferably 15-40% by weight. When the vinyl acetate content is less than 10% by weight, the transparency becomes insufficient in the crosslinking and curing at high temperature, while when it exceeds 50% by weight, the impact resistance and penetration resistance of the resulting sandwich glass become poor.

In the production of the sandwich glass according to the invention, the organic peroxide is used as a curing agent for ethylene-vinyl acetate copolymer, which can use any peroxides creating radical by decomposition at a temperature of not lower than 100° C. Considering the safeness in the mixing, organic peroxides having a 10 hour half-value period decomposition temperature of not lower than 70° C. are preferably used, an example of which includes 2,5-dimethylhexane-2,5-dihydroperoxide, 2,5-dimethyl-2,5-di(t-butylperoxy)hexane-3, di-t-butyl peroxide, t-butylcumyl peroxide, 2,5-dimethyl-2,5-di(t-butylperoxy)hexane, dicumyl peroxide, α,α'-bis(t-butylperoxyisopropyl)benzene, n-propyl-4,4'-bis(t-butylperoxy)valerate, 2,2-bis(t-butylperoxy)butane, 1,1-bis(t-butylperoxy)cyclohexane, 1,1-bis(t-butylperoxy)-3,3,5-trimethyl cyclohexane, t-butylperoxy benzoate, benzoyl peroxide and the like. As the organic peroxide, at least one of the above peroxides is used in an amount of 5 parts by weight or less based on 100 parts by weight of ethylene-vinyl acetate copolymer.

According to the invention, acryloxy group-containing compound, methacryloxy group-containing compound or aryl group-containing compound may be add as a curing aid for enhancing initial modulus of the ethylene-vinyl acetate copolymer to improve the penetration resistance. As the compound used for this purpose, use may be made of derivatives of acrylic acid and methacrylic acid such as esters thereof and so on.

As an alcohol residue of the ester, mention may be made of alykyl groups such as methyl group, ethyl group, dodecyl group, stearyl group, lauryl group and the like as well as cyclohexyl group, tetrahydrofurfuryl group, aminoethyl group, 2-hydroxyethyl group, 3-hydroxypropyl group, 3-chloro-2-hydroxypropyl group and so on. Furthermore, esters with polyfunctional alcohol such as ethylene glycol, triethylene glycol, polyethylene glycol or the like may be used.

As the aryl group-containing compound, diallyl phthalate, diallyl fumalate, diallyl maleate, triallyl isocyanurate, triallyl cyanurate and the like are preferably used.

Moreover, the amount of such a compound is 50% by weight or less to the ethylene-vinyl acetate copolymer.

According to the invention, a silane coupling agent may be added for further improving the adhesion force between ethylene-vinyl acetate copolymer and glass plate. As the silane coupling agent used for this purpose, mention may be made of well-known ones such as γ-chloropropylmethoxy silane, vinyltrichloro silane, vinyltriethoxy silane, vinyl-tris(β-methoxyethoxy)silane, γ-methacryloxypropyl trimethoxy silane, β-(3,4-ethoxycyclohexyl)ethyl-trimethoxy silane, γ-glycidoxypropyl trimethoxy silane, vinyltriacetoxy silane, γ-mercaptopropyl trimethoxy silane, γ-aminopropyl triethoxy silane, N-β-(aminoethyl)-γ-aminopropyl trimethoxy silane and the like. The amount of the above silane coupling agent added is sufficient to be 5 parts by weight or less.

If necessary, a polymerization retarder such as hydroquinone, hydroquinone monomethyl ether, p-benzoquinone, methylhydroquinone or the like may be added in an amount of 5 parts by weight or less for improving the safeness, and also a coloring agent, a ultraviolet ray absorbing agent, an antioxidant, a discoloration preventive agent and the like may be added.

As mentioned above, according to the invention, there can be provided sandwich glasses having excellent impact resistance and penetration resistance in case of using in the front glass and side glass of the automobile, the window glass of the building or the like and being safe even when the breakage is caused due to the action of external force.

The following examples are given in illustration of the invention and are not intended as limitations thereof.

EXAMPLE 1

Various components as shown in the following Table 1 were compounded and mixed in a roll mill heated at 80° C. to prepare a resin. This resin was shaped into a sheet of 0.76 mm in thickness by means of a press and inserted between two previously washed and dried float glass plates of 3 mm in thickness, which was placed in a rubber bag. After the deaeration under vacuum, the glass assembly was preliminarily pressed at a temperature of 80° C. Then, the preliminarily pressed sandwich glass was placed in an oven and treated at 1300° C. for 30 minutes. The resulting sandwich glass was high in the transparency and free from optical distortion.

When four specimens of the sandwich glass was subjected to a shot bag test from a dropping height of 75 cm according to a method of JIS R3205(1983), there was observed no crack in all specimens.

The transparency test was made by means of a haze meter made by Suga Testing Machine Co., Ltd. and as a result, a haze value was 0.8.

The measured values were also shown in Table 1.

EXAMPLE 2

The same procedure as in Example 1 was repeated except that the amount of Arucon M-100 (trade name) used was changed into 80 parts by weight. No crack was observed in all of four specimens by the shot bag test. Moreover, the haze value was 0.9.

COMPARATIVE EXAMPLE 1

The same procedure as in Example 1 was repeated except that the amount of Ultrasen 634 (trade name) used was changed into 100 parts by weight. In all of four specimens, the average length of opening portion in crack observed by the shot bag test was 60 mm. Moreover, the haze value was 0.6.

TABLE 1

|  | Example 1 | Example 2 | Comparative Example 1 |
|---|---|---|---|
| Compounding recipe (part by weight) |  |  |  |
| Ultrasen 634 *1 | 100 | 100 | 100 |
| Arucon M-100 *2 | 30 | 80 | — |
| triaryl isocyanurate | 2 | 2 | 2 |
| γ-methacryloxy propyl trimethoxy silane | 0.5 | 0.5 | 0.5 |
| 1,1-bis(t-butylperoxy) 3,3,5-trimethyl cyclohexane | 2 | 2 | 2 |
| Test result |  |  |  |
| Shot bag test dropping height: 75 cm | no crack | no crack | crack length 60 cm |
| Transparency test haze value (%) | 0.8 | 0.9 | 0.6 |

*1 Ultrasen 634 is a trade name of ethylene-vinyl acetate copolymer by Toso Kabushiki Kaisha, which has a vinyl acetate content of 26% by weight.
*2 Arucon M-100 is a trade name of alicyclic hydrocarbon resin made by Arakawa Kagaku Kogyo Kabushiki Kaisha having a weight average molecular weight of 700.

What is claimed is:

1. A sandwich glass comprising two glass plates and a resin layer interposed therebetween, and produced by interposing a thermosetting resin layer comprised of ethylene-vinyl acetate copolymer, hydrocarbon resin and organic peroxide between said two glass plates and then thermosetting said resin layer.

2. The sandwich glass according to claim 1, wherein amounts of said hydrocarbon resin and organic peroxide added to said ethylene-vinyl acetate copolymer are 1-100 parts by weight and 0.1-5 parts by weight, respectively.

3. The sandwich glass according to claim 1, wherein said hydrocarbon resin has a weight average molecular weight of 200-50000.

4. The sandwich glass according to claim 1, wherein said ethylene-vinyl acetate copolymer has a vinyl acetate content of 10-50% by weight.

5. The sandwich glass according to claim 1, wherein at least one of acryloxy group-containing compound, methacryloxy group-containing compound and aryl group-containing compound is added in an amount of not more than 50 parts by weight to said ethylene-vinyl acetate copolymer as a curing aid.

6. The sandwich glass according to claim 1, wherein a silane coupling agent is added as an adhesion improver for glass in an amount of not more than 5 parts by weight to said ethylene-vinyl acetate copolymer.

7. The sandwich glass according to claim 1, wherein said hydrocarbon resin is selected from the group consisting of natural resins and synthetic resins.

8. The sandwich glass according to claim 7, wherein said natural resin is selected from the group consisting of rosin, rosin derivatives, terpene resin, dammar, copal and shellac.

9. The sandwich glass according to claim 8, wherein said rosin is selected from the group consisting of gum resin, tar oil resin and wood resin.

10. The sandwich glass according to claim 8, wherein said rosin derivative is selected from the group consisting of hydrogenated rosin, disproportionated rosin, rosin polymer, rosin ester and metal salt of rosin.

11. The sandwich glass according to claim 8, wherein said terpene resin is selected from alpha-pinene, beta-pinene and terpene phenol resin.

12. The sandwich glass according to claim 7, wherein said synthetic resins are selected from the group consisting of petroleum resin, phenolic resins and xylene resin.

13. The sandwich glass according to claim 12, wherein said petroleum resin is selected from the group consisting of aliphatic petroleum resin, aromatic petroleum resin, alicyclic petroleum, copolymeric petroleum resin, hydrogenated petroleum resin, pure monomeric petroleum resin and cumarin indene.

14. The sandwich glass according to claim 12, wherein said phthalate resin is selected from the group consisting of alkyl phenol, and modified phenolic resins.

15. The sandwich glass according to claim 12, wherein said xylene resin is a modified xylene resin.

* * * * *